May 27, 1924.

T. W. PHILLIPS

SPIGOT ATTACHMENT

Filed July 31, 1922

1,495,713

Thomas W. Phillips
INVENTOR

BY Victor J. Evans
ATTORNEY

WITNESS:

Patented May 27, 1924.

1,495,713

UNITED STATES PATENT OFFICE.

THOMAS W. PHILLIPS, OF PHILADELPHIA, PENNSYLVANIA.

SPIGOT ATTACHMENT.

Application filed July 31, 1922. Serial No. 578,812.

*To all whom it may concern:*

Be it known that I, THOMAS W. PHILLIPS, a citizen of the United States, residing at Philadelphia, in the county of Philadelphia and State of Pennsylvania, have invented new and useful Improvements in Spigot Attachments, of which the following is a specification.

My present invention has reference to an anti-splashing device for water faucets.

My object is to produce a device of this character which shall be of an extremely simple nature, cheaply manufactured and marketed, readily applied in the outlet of any ordinary faucet, firmly gripping the wall thereof and effectively preventing the splashing of water passing through the faucet.

The drawing which accompanies and forms part of this application, illustrates a satisfactory embodiment of the improvement reduced to practice, and wherein:—

Figure 1:
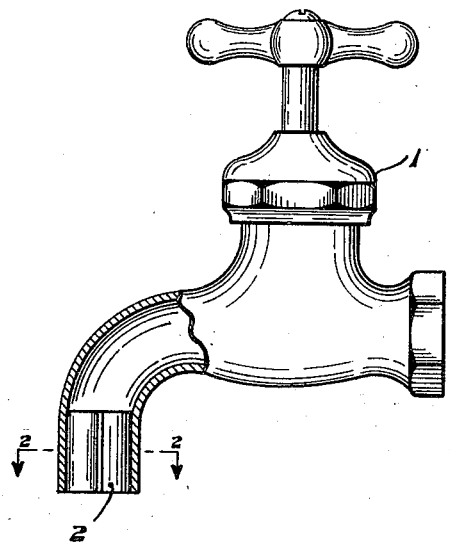
Figure 1 is an elevation of a faucet with parts broken away and parts in section to illustrate the application of the improvement.
Figure 2:
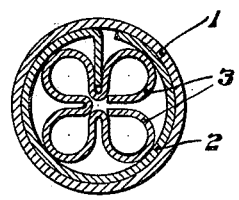
Figure 2 is an enlarged sectional view on the line 2—2 of Figure 1.

In the drawing, the numeral 1 designates a faucet of an ordinary construction.

My improvement includes a split spring tube 2 which is designed to be received in the mouth of the faucet and to frictionally engage the bore thereof.

Fixed in the tube 2 there are any desired number of smaller tubes 3. Preferably the smaller tubes 3 are constructed from a single strip of metal bent upon itself to provide both inwardly and outwardly rounded portions, the inwardly rounded portions at the center of the strip not necessarily contacting. The tube 2 is preferably formed of spring steel or analogous resilient material, and the normal expanding spring action thereof causes a binding action against the inner wall of the faucet for securely holding the tube in place; however, if it is found desirable or necessary in practice, it is to be understood that the tube may be attached in any approved manner. The smaller tubes 3 may be soldered to the resilient or spring tube 2 for holding them in position.

Water flowing though the faucet will be caused to flow through the restricted passages provided by the smaller tubes 3, and as a consequence such water will not be permitted to splash in finding its outlet through the faucet.

Having described the invention, I claim:—

1. An anti-splashing device for faucets, comprising a split tube designed to be arranged in the outlet of a faucet and to frictionally engage the wall thereof, and a plurality of smaller tubes fixed in said split tube.

2. An anti-splashing device for faucets, comprising a split spring tube designed to be inserted in the outlet of a faucet and to frictionally engage the wall thereof, said split tube having fixed therein a plurality of longitudinally arranged restricted passages formed from a single strip of metal bent upon itself so as to form both inwardly and outwardly rounded portions.

In testimony whereof I affix my signature.

THOMAS W. PHILLIPS.